United States Patent Office 3,031,487
Patented Apr. 24, 1962

3,031,487
ALKYL ACID PHOSPHATE SALT OF N'N'-DI-ALKYL-p-PHENYLENE DIAMINE
Joseph A. Chenicek, Long Grove, Ill., assignor to Universal Oil Products Company, Des Plaines, Ill., a corporation of Delaware
No Drawing. Filed Feb. 28, 1961, Ser. No. 92,186
7 Claims. (Cl. 260—461)

This application is a continuation-in-part of my copending application Serial No. 813,698 filed May 18, 1959, and relates to a novel composition of matter. The novel composition of matter is particularly useful as an inhibitor for the stabilization of hydrocarbons.

A particularly satisfactory inhibitor for gasoline is N,N'-di-sec-butyl-p-phenylene diamine. While this inhibitor is one of the best, if not the best, inhibitor available for use in gasoline at the present time, research continues to search for ways and means of improving the inhibitors. It now has been found that surprisingly improved results are obtained by a novel modification of the phenylene diamine inhibitors.

The novel process of the present invention is particularly applicable to the treatment of gasolines, including thermally cracked gasoline, catalytically cracked gasoline, coker gasoline, polymer gasoline, other unsaturated gasolines, straight run gasoline, natural gasoline, other saturated gasolines, or mixtures of these. The novel process of the present invention also is of utility for the stabilization of other hydrocarbon fractions including normally gaseous hydrocarbons such as propane, propylene, butane, butylene or mixtures thereof, and hydrocarbon distillates such as jet fuel, kerosene, diesel fuel, fuel oil, lubricating oil, turbine oil, marine oil, hydrocarbon solvents, residual oils, etc.

In one embodiment the present invention relates to a method of stabilizing hydrocarbons which comprises incorporating therein an inhibitor comprising an alkyl acid phosphate salt of an N,N'-di-alkyl-p-phenylene diamine.

In a specific embodiment the present invention relates to a method of stabilizing gasoline which comprises incorporating therein an inhibitor comprising mixed mono- and diisooctyl acid orthophosphate salts of N,N'-di-sec-butyl-p-phenylene diamine.

From the above embodiments, it will be noted that the novel inhibitor of the present invention is an alkyl acid phosphate salt of an N,N'-di-alkyl-p-phenylene diamine. The improved results obtained with this inhibitor are surprising because, as will be shown by the examples appended to the present specifications, the alkyl acid phosphates are of substantially no value in improving the induction period of the gasoline. However, in combination with the phenylene diamine inhibitor, an increase in the induction period is obtained. These improved results offer two important advantages in (1) obtaining higher induction periods than obtainable by the use of the same concentration of the phenylene diamine inhibitor alone, or (2) obtaining the same induction period by using a lesser amount of the phenylene diamine inhibitor. It is noted that these improved results are obtained with a lesser concentration of phenylene diamine inhibitor and accordingly at a lower cost. Furthermore, the phosphates used in the inhibitor composition are available at a considerably lower cost than the phenylene diamines, and the use of the mixture serves to even further reduce the cost thereof.

In addition to improving the induction period of the gasoline, the novel inhibitor of the present invention also provides additional benefits which are of importance in gasoline. The novel salt of the present invention, when used in leaded gasoline, serves as a scavenger for the tetraethyl lead and thereby prevents lead deposits, preignition and other undesirable effects of the tetraethyl lead. In addition, the novel inhibitor of the present invention serves to reduce stalling of carbureted engines due to carburetor icing. Still further, the novel inhibitor serves to reduce corrosion.

The improved results of the novel inhibitor are surprising because, as hereinbefore set forth, the alkyl acid phosphates are of substantially no value in increasing the induction period of gasoline. Therefore, the use of the alkyl acid phosphates in combination with the phenylene diamine inhibitors may be considered as a synergistic effect, in which the benefits obtained by the use of a mixture of these components exceeds the sum of the benefits obtained through the use of these components alone. Normally it would have been expected that the mixture of phosphate and phenylene diamine would not increase the induction period of the gasoline beyond that obtained by the phenylene diamine alone, because the alkyl acid phosphate alone did not improve the induction period. Surprisingly, it has been found that the use of these components in combination results in a considerable increase in the induction period.

Any suitable N,N'-di-alkyl-p-phenylene diamine may be used in preparing the salt of the present invention. Particularly preferred phenylene diamines are N,N'-di-sec-butyl-p-phenylene diamine and N,N'-di-octyl-p-phenylene diamine, the latter more particularly comprising N,N'-di-3-(5-methylheptyl)-p-phenylene diamine and N,N'-di-2-octyl-p-phenylene diamine. Other N,N'-di-alkyl-p-phenylene diamines include N,N'-diisopropyl-p-phenylene diamine, N,N'-di-sec-amyl-p-phenylene diamine, N,N'-di-sec-hexyl-p-phenylene diamine, N,N'-di-sec-heptyl-p-phenylene diamine, N,N'-di-sec-nonyl-p-phenylene diamine, N,N'-di-sec-decyl-p-phenylene diamine, N,N'-di-sec-undecyl-p-phenylene diamine, N,N'-di-sec-dodecyl-p-phenylene diamine, etc.

In general the N,N'-di-sec-alkyl-p-phenylene diamines are preferred. However, in some cases, the alkyl substituents may be of normal or tertiary configuration. Also, the symmetrical N,N'-di-alkyl-p-phenylene diamines are preferred although, in some cases, the unsymmetrical compounds may be employed. Unsymmetrical compounds comprise those in which the alkyl substituents attached to the nitrogen atoms are different, the secondary alkyl group or groups preferably being from the alkyl substituents hereinbefore set forth.

Any suitable alkyl acid phosphate may be used in preparing the salt of the present invention and includes the alkyl acid orthophosphates and the alkyl acid pyrophosphates. In general, the alkyl acid orthophosphates are preferred. Particularly preferred phosphates are mono- and/or diamyl acid orthophosphates, mono- and/or dioctyl acid orthophosphates. These phosphates are available commercially as mixtures of the mono- and dialkyl acid orthophosphates and, as another advantage of the present invention, the mixed mono- and dialkyl acid orthophosphates may be used in preparing the novel inhibitor of the present invention without the additional time and expense of separating the individual components.

While the mixed mono- and diamyl acid orthophosphates and the mixed mono- and dioctyl acid orthophosphates are preferred, it is understood that other suitable alkyl acid phosphates may be used in preparing the inhibitor of the present invention. Other alkyl acid phosphates include monopropyl acid orthophosphate, dipropyl acid orthophosphate, mixture of mono- and dipropyl acid orthophosphate, monobutyl acid orthophosphate, dibutyl acid orthophosphate, mixture of mono- and dibutyl acid orthophosphate, monohexyl acid orthophosphate, dihexyl acid orthophosphate, mixture of mono- and dihexyl acid orthophosphate, monoheptyl acid orthophosphate, diheptyl acid orthophosphate, mixture of mono- and diheptyl acid orthophosphate, mononyl acid orthophosphate, dinonyl acid orthophosphate, mixture of mono- and dinonyl acid orthophosphate, monodecyl acid orthophosphate, didecyl acid orthophosphate, mixture of mono- and didecyl acid orthophosphate, monoundecyl acid orthophosphate, diundecyl acid orthophosphate, mixture of mono- and diundecyl acid orthophosphate, monododecyl acid orthophosphate, didodecyl acid orthophosphate, mixture of mono- and didodecyl acid orthophosphate, etc., the corresponding mono- and/or dialkyl acid pyrophosphates, as well as mixtures of the ortho and pyrophosphates. Mixtures of the mono- and dialkyl acid orthophosphates, mixtures of polyalkyl acid pyrophosphates, as well as mixtures of the ortho and pyrophosphates, are available commercially, generally at a lower cost, and may comprise preferred reactants for use in preparing the novel inhibitor of the present invention.

The proportions of N,N'-dialkyl-p-phenylene diamine and alkyl acid phosphates used in preparing the salt may vary over wide limits. In a preferred embodiment the salt is prepared using from about 1 to about 2 mol proportions of alkyl acid phosphate per one mol proportion of p-phenylene diamine, although higher or lower concentrations may be used in some cases. Stated another way, the weight percent of N,N'-dialkyl-p-phenylene diamine in the inhibitor composition, exclusive of solvent, preferably is within the range of from about 35% to about 75% and still more particularly from about 40% to about 70% by weight of N,N'-dialkyl-p-phenylene diamine.

The salt may be prepared in any suitable manner and, in general, is prepared by admixing the alkyl acid phosphate and N,N'-dialkyl-p-phenylene diamine at ambient temperature, preferably with vigorous stirring. The salt is prepared readily at room temperature, although slightly elevated temperatures which generally will not exceed about 200° F. may be employed when desired. Excessive temperatures must be avoided because this may result in the undesired formation of phosphor adimic acid derivatives or other reaction products. In other words, it is essential that the temperature be below that at which water is liberated during the formation of the salt. In another embodiment, the salt may be formed in situ by adding the phenylene diamine and acid phosphate, either at the same or different time, to the gasoline and allowing the salt to form therein.

In general, it is preferred to utilize a solvent, either in forming a more fluid mixture of the acid and/or amine before mixing or during the mixing thereof. In some cases, it is desired to market the inhibitor compound as a solution in a suitable solvent, and conveniently the same solvent is used during the preparation of the salt. Any suitable solvent may be employed and preferably comprises a hydrocarbon distillate and more particularly an aromatic hydrocarbon, including benzene, toluene, xylene, cumene, etc., or a mixture of these, as well as other hydrocarbon mixtures such as naptha, kerosene, etc.

The amount of inhibitor to be employed will depend upon the particular salt and the hydrocarbon in which it is to be used. In general, the inhibitor will be used in a concentration of less than about 1% by weight and thus may range from about 0.00001% to about 1% and still more preferably within the range of from about 0.0001% to 0.5% by weight of the hydrocarbon. It is understood that this inhibitor may be used along with other additives used in hydrocarbons as, for example, copper deactivator, detergent, dye, etc. When desired, the inhibitor of the present invention may be prepared in admixture with one or more of the other additives and marketed as a commodity for multiple purposes.

The following examples are introduced to illustrate further the novelty and utility of the present invention but not with the intention of unduly limiting the same.

EXAMPLE I

The inhibitor of this example is the mixed mono- and diisoamyl acid orthophosphate salts of N,N'-di-sec-butyl-p-phenylene diamine. The inhibitor was prepared using equal mol proportions of alkyl acid phosphate and phenylene diamine. The inhibitor was prepared by slowly adding 21.2 grams of mixed mono- and diisoamyl acid orthophosphate to 22 grams of N,N'-di-sec-butyl-p-phenylene diamine at room temperature, with constant stirring. The reaction mixture warmed slightly. The product was recovered as a bluish red, viscous liquid.

EXAMPLE II

Another preparation of the mixed mono- and di-isoamyl acid orthophosphate salts of N,N'-di-sec-butyl-p-phenylene diamine was prepared in substantially the same manner as described in Example I except that the phosphate was first dissolved in 43.2 grams of xylene as a solvent, and the resultant solution was added gradually to the N,N'-di-sec-butyl-p-phenylene diamine. It will be noted that in this case the inhibitor compound is recovered as a 50% by weight solution.

The inhibitor prepared in the above manner was evaluated in a thermally cracked gasoline which had a normal (not containing inhibitor) induction period of 112 minutes. Different concentrations of the inhibitor compound prepared in the above manner were evaluated. For comparative purposes, evaluations also were made of different samples of the gasoline containing different concentrations of N,N'-di-sec-butyl-p-phenylene diamine. The results of these evaluations are shown in the following table:

*Table I*

[Parts per million]

| Sample No. | N,N'-di-sec-butyl-p-phenylene diamine | Mono- and diisoamyl acid orthophosphates | Induction Period (Minutes) |
| --- | --- | --- | --- |
| 1 | None | None | 112 |
| 2 | 15 | None | 407 |
| 3 | 30 | None | 600 |
| 4 | 45 | None | 802 |
| 5 | 7.6 | 7.4 | 437 |
| 6 | 15 | 15 | 677 |
| 7 | 23 | 22 | 860 |

From the data in the above table, it will be noted that salt containing 15 parts per million of the phenylene diamine (sample 6) gave an induction period of 677 minutes in comparison to an induction period of 407 minutes (sample 2) when using 15 parts per million of the phenylene diamine alone. This considerable increase is surprising in view of the fact that the alkyl acid phosphate itself did not have any substantial effect on the induction period as will be shown in a following example. Even when compared on a total inhibitor addition of 15 parts per million (sample 5 compared to sample 2), it will be noted that the salt gave a higher induction period.

The same improved results are noted in comparing sample 7 with sample 3, in which the salt containing 23 parts per million of the phenylene diamine (sample 7) gave an induction period of 860 minutes as compared to sample 3 in which 30 parts per million of the phenylene diamine gave an induction period of 600 minutes. Here again, even when compared on the total concentration, 45 parts per million of the salt (sample 7) gave an 860 minute induction period as compared to 802 minutes (sample 4) for the phenylene diamine alone.

EXAMPLE III

The inhibitor of this example is the mixed mono- and diisooctyl acid orthophosphate salts of N,N'-di-sec-butyl-p-phenylene diamine. This inhibitor was prepared in substantially the same manner as described in Example II except that the mixed mono- and diisooctyl acid orthophosphates were used. When prepared in the absence of the solvent, the product was a bluish red, viscous liquid.

This inhibitor also was prepared in the presence of xylene as the solvent. The following concentrations were used in this preparation: 27.5 grams of N,N'-di-sec-butyl-p-phenylene diamine, 33.5 grams of mixed mono- and diisooctyl acid orthophosphate and 61 grams of xylene.

When evaluated in other samples of the thermally cracked gasoline described in Example II, a sample of the gasoline containing 13.6 parts per million of the phenylene diamine portion of the salt gave an induction period of 615 minutes and another sample of the gasoline containing 20 parts per million of the phenylene diamine portion of the salt gave an induction period of 805 minutes. These induction periods are considerably greater than those obtained with the phenylene diamine alone. For example, compare the induction period of 615 minutes obtained with the salt (13.6 parts per million of the phenylene diamine) to sample 2 (15 parts per million of the phenylene diamine) of Table I in which the induction period was 407 minutes. Also compare the induction period of 805 minutes obtained with the salt (20 parts per million of the phenylene diamine) to sample 3 (30 parts per million of the phenylene diamine) of Table I in which an induction period of 600 minutes was obtained.

EXAMPLE IV

As hereinbefore set forth, the alkyl acid orthophosphate by itself was of substantially no value in increasing the induction period of the gasoline. Thirty parts per million of the mixed mono- and diisooctyl acid orthophosphates were incorporated in another sample of the thermally cracked gasoline described in Example II. This served to increase the induction period of the gasoline from 112 minutes to 141 minutes. It will be noted that this is substantially of no improvement and is in contrast to the considerable improvement obtained by using the salt of the phosphate and phenylene diamine.

EXAMPLE V

Different samples of the mixed mono- and diisooctyl acid orthophosphate salts of N,N'-di-sec-butyl-p-phenylene diamine were prepared to contain different proportions of the components. These preparations were made in substantially the same manner as described in Example II except for the different concentrations of the components. The results of these preparations are reported in the following table:

The inhibitor in all cases was used in a concentration of 30 parts per million of active ingredient.

*Table II*

SALTS CONTAINING FOLLOWING COMPOSITIONS

| Sample No. | N,N'-di-sec-butyl-p-phenylene diamine, Weight Percent | Mixed mono- and diisooctyl orthophosphates, Weight Percent | Induction Period (Minutes) |
| --- | --- | --- | --- |
| 8 | 100 | None | 1 529 |
| 9 | 76.8 | 32.2 | 552 |
| 10 | 65.8 | 34.2 | 598 |
| 11 | 55.3 | 44.7 | 598 |
| 12 | 45.2 | 54.8 | 548 |
| 13 | 35.4 | 64.6 | 532 |

1 Average of three determinations.

From the data in the above table, it will be noted that inhibitor compositions containing from about 35% to about 75% by weight of the phenylene diamine in the composition resulted in induction periods greater than obtained by 100% by weight of the phenylene diamine. Still more particularly the concentrations of from about 40% to about 70% and especially at 60% to 70% gave even greater induction periods. While these are preferred, it is understood that even the lower concentrations offer advantages in many applications.

EXAMPLE VI

The inhibitor of this example is the mixed mono- and diisooctyl acid orthophosphate of N,N'-di-3-(5-methylheptyl)-p-phenylene diamine. It was prepared in substantially the same manner as described in Example II. The proportions of ingredients were 33.3 grams of N,N'-di-3-(5-methylheptyl)-p-phenylene diamine and 26.7 grams of mixed mono- and diisooctyl acid orthophosphate. The product is recovered as a bluish red, viscous liquid.

Another preparation was made similar to the above except that the phosphate was dissolved in 60 grams of xylene and then added to the phenylene diamine.

When evaluated in another sample of the thermally cracked gasoline previously described, 30 parts per million of the salt containing 16.5 parts per million of the phenylene diamine, increased the induction period of the gasoline from 112 minutes to 473 minutes. In contrast to this, 16.5 parts per million of N,N'-di-3-(5-methylheptyl)-p-phenylene diamine increased the induction period of the gasoline to 328 minutes. Here again, it will be noted that the salt was considerably more effective in increasing the induction period of the gasoline.

EXAMPLE VII

The inhibitor of this example is the mixed mono- and diisooctyl acid orthophosphate salts of N,N'-di-2-octyl-p-phenylene diamine. This inhibitor was prepared using 26.7 grams of phosphate and 33.3 grams of the phenylene diamine, with the reaction being effected in substantially the same manner as hereinbefore set forth. The product is recovered as a bluish red, viscous liquid.

Another preparation similar to that described above except for the use of xylene solvent was evaluated in another sample of the thermally cracked gasoline described previously. Thirty parts per million of the salt containing 16.5 parts per million of the phenylene diamine portion served to increase the induction period of the gasoline to 518 minutes. In contrast, 16.5 parts per million of N,N'-di-2-octyl-p-phenylene diamine increased the induction period of the gasoline to 316 minutes. Again it is noted that the salt was very effective in increasing the induction period of the gasoline.

EXAMPLE VIII

Mixed mono- and diisooctyl acid orthophosphate salts of N,N'-di-sec-amyl-p-phenylene diamine is prepared in substantially the same manner as hereinbefore described. The resultant salt is used in a concentration of 0.001% by weight in jet fuel and serves to retard deterioration thereof.

I claim as my invention:

1. An alkyl acid phosphate salt of N,N'-dialkyl-p-phenylene diamine, the phosphate component of said salt having an alkyl group of from 3 to 12 carbon atoms.
2. Mixed mono- and diisoamyl acid orthophosphate salts of N,N'-di-sec-butyl-p-phenylene diamine.
3. Mixed mono- and diisooctyl acid orthophosphate salts of N,N'-di-sec-butyl-p-phenylene diamine.
4. An alkyl acid orthophosphate salt of N,N'-di-sec-octyl-p-phenylene diamine, the phosphate component of said salt having an alkyl group of from 3 to 12 carbon atoms.
5. Mixed mono- and diisoamyl acid orthophosphate salts of N,N'-di-3-(5-methylheptyl)-p-phenylene diamine.
6. Mixed mono- and diisooctyl acid orthophosphate salts of N,N'-di-3-(5-methylheptyl)-p-phenylene diamine.
7. Mixed mono- and diisooctyl acid orthophosphate salts of N,N'-di-2-octyl-p-phenylene diamine.

References Cited in the file of this patent

UNITED STATES PATENTS 2,403,763 Smith et al. _____ July 22, 1946
2,863,904 Cantrell et al. _____ Dec. 9, 1958
2,905,542 Gottshall et al. _____ Sept. 22, 1959